United States Patent [19]

O'Hara

[11] Patent Number: 5,041,345
[45] Date of Patent: Aug. 20, 1991

[54] SECONDARY SEAL FOR VENTED ELECTROCHEMICAL CELLS

[75] Inventor: Thomas J. O'Hara, Bay Village, Ohio

[73] Assignee: Eveready Battery Company, St. Louis, Mo.

[21] Appl. No.: 535,390

[22] Filed: Jun. 8, 1990

[51] Int. Cl.[5] .................... H01M 2/12; H01M 2/04
[52] U.S. Cl. ........................................ 429/53; 429/56; 429/168; 429/177
[58] Field of Search ............... 429/53, 56, 168, 169, 429/177

[56] References Cited

U.S. PATENT DOCUMENTS

| | | |
|---|---|---|
| 3,754,997 | 8/1973 | Ralston ............................... 429/168 |
| 3,841,913 | 10/1974 | Anderson ........................... 429/168 |
| 3,855,006 | 12/1974 | Kegelman .......................... 136/177 |
| 4,397,919 | 8/1983 | Ballard ................................. 429/53 |
| 4,931,368 | 6/1990 | Ayers et al. ......................... 429/53 |

FOREIGN PATENT DOCUMENTS 125037 10/1984 European Pat. Off. .
58-007759 1/1983 Japan .
60-249241 12/1985 Japan .

Primary Examiner—Stephen J. Kalafut
Attorney, Agent, or Firm—Robert W. Welsh

[57] ABSTRACT

An electrochemical cell having a temperature-activated vent in series with a pressure-activated vent. The inner cover of the inner cell housing has an upstanding rim around a central pressure release vent. The outer cover that closes the outer cell container has an annular area pressed against this rim and sealed to the rim by a heat fusible solder to form a temperature-responsive vent mechanism in series with the pressure-responsive vent.

5 Claims, 1 Drawing Sheet

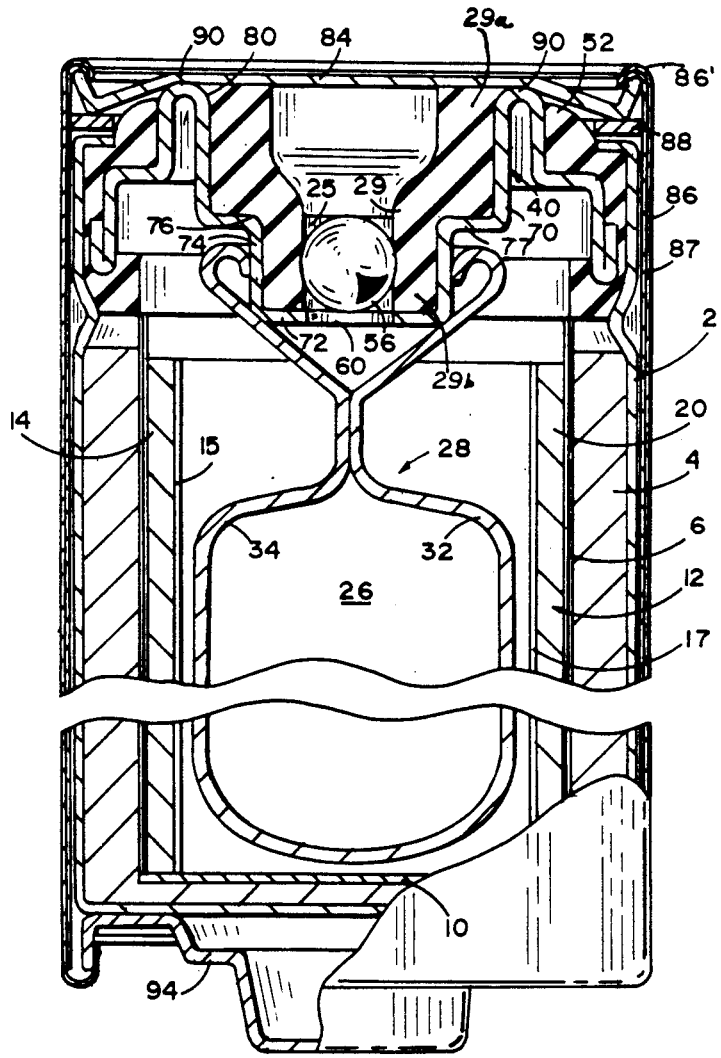

SECONDARY SEAL FOR VENTED ELECTROCHEMICAL CELLS

BACKGROUND OF THE INVENTION

This invention relates to electrochemical cells and particularly to such cells having a special cover/vent well construction providing for controlled vent release.

In copending application Ser. No. 102,814, filed Sept. 22, 1987, and entitled IMPROVED VENT LINER AND COVER CONSTRUCTION FOR GALVANIC CELLS, now U.S. Pat. No. 4,931,368, is disclosed an electrochemical cell with a specially contoured inner cover and vent well which contains a pressure-activated vent. Such a construction serves to allow venting on a controlled basis if a predetermined interior pressure is reached within the cell, to thereby avoid accidental buildup of excessive pressures.

SUMMARY OF THE INVENTION

The present invention comprises an improved cell construction having a temperature-activated vent mechanism in series with the noted pressure-activated vent mechanism. It serves to prevent liquid passage and substantially reduce gas transmission The inner cover of the inner cell housing has a central pressure release vent. Around this vent is an upstanding rim. The outer cover that closes the outer cell container has an annular area pressed down against this rim and sealed to the rim by a temperature-activated material which is preferably solder.

BRIEF DESCRIPTION OF THE DRAWING

The figure is a greatly enlarged side elevational sectional view of a cell employing this invention.

DESCRIPTION OF THE PREFERRED EMBODIMENT

Referring to FIG. 1, there is shown a cross sectional view of one type of cell employing this invention, in this case being a cylindrical nonaqueous electrochemical cell comprising an anode, a cathode collector and a liquid cathode-electrolyte.

The cathode-electrolyte may comprise a solution of an ionically conductive solute dissolved in a liquid active cathode. The cathode material can be a liquid oxyhalide of an element of Group V or Group VI of the Periodic Table, such as sulfuryl chloride, thionyl chloride, phosphorus oxychloride, thionyl bromide, chromyl chloride, vanadyl tribromide and selenium oxychloride. Also usable as a cathode material is a halide of an element of Group IV to Group VI of the Periodic Table, such as sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, tin bromide trichloride, tin dibromide dichloride and tin tribromide chloride.

The solute for use in the cathode-electrolyte can be a simple or double salt which will produce an ionically conductive solution. Preferred solutes for nonaqueous systems are complexes of inorganic or organic Lewis acids and inorganic ionizable salts. Typical Lewis acids suitable for use in conjunction with liquid oxyhalide active cathodes include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

If desired, and specifically for the halides, a cosolvent can be added to the cathode-electrolyte to alter the dielectric constant, viscosity or solvent properties of the solution to achieve better conductivity. Some examples of suitable cosolvents are tetrahydrofuran, 1,3-dioxolane, 3-methyl-2-oxazolidone, propylene carbonate, gamma-butyrolactone, sulfolane, ethylene glycol sulfite, dimethyl sulfite, benzoyl chloride, dimethoxyethane, dimethyl isoxazole, diethyl carbonate, sulfur dioxide and the like.

The cell housing comprises a cylindrical cell container 2 having an open end that is closed by a cell cover 40. A cathode collector shell 4 is in contact with the inner upstanding circumference of the cell container 2, thereby adapting the container 2 as the cathodic or positive terminal for the cell. Exposed within and in contact with the inner circumference of cathode collector 4 is a separator liner 6 with a bottom separator or disk 10. If desired, the cathode collector material could be extruded within the container 2, rolled with the container material or composed of one or more segments to form a cylindrical tube when placed in the container.

An anode is preferably a two-member anode 12 comprising first and second half cylindrical members 14 and 20 having flat end faces and arranged in opposing fashion to form an axial cavity 26 therebetween.

Cathode collector shell 4 is electronically conductive to permit external electrical contact to be made with the active cathode material and also to provide extended area reaction sites for the cathodic electrochemical processes of the cell. Materials suitable for use for cathode collector shell 4 are carbon materials and metals such as nickel, with acetylene black being preferable. In addition, cathode collector shell 4, if made of a particulate material, should be capable of being molded directly within container 2 or capable of being molded into variously sized discrete bodies that can be handled without cracking or breaking. If cathode collector shell 4 is fabricated from a carbonaceous material, a suitable binder, with or without stabilizers, can be added to the cathode collector materials. Suitable binders for this purpose are vinyl polymers, polyethylene, polypropylene, polyacrylics, polystyrene and the like. Polytetrafluoroethylene would be the preferred binder for cathode collector shell 4 if the cell shown in the figure were used with a liquid oxyhalide cathode. The binder, if required, should be added in an amount between about 5% and about 30% by weight of the molded cathode collector shell 4, since an amount less than 5% would not provide sufficient strength to the molded body, while an amount larger than 30% would wetproof the surface of the carbon and/or reduce the available surface of the carbon, thereby reducing the activation site areas available for the cathodic electrochemical process of the cell. Preferably, the binder should be between 10% and 25% by weight of the cathode collector shell 4. The materials selected for cathode collector shell 4 are to be chemically stable in the cell in which they are to be used.

Anode 12 is a consumable metal and can be an alkali metal, an alkaline earth metal, or an alloy of alkali metals or alkaline earth metals with each other and other metals ("alloy" as used herein includes mixtures, solid solutions such as lithium-magnesium, and intermetallic compounds such as lithium monoaluminide). The preferred materials for anode 12 are the alkali metals, particularly lithium, sodium and potassium. For the cell shown, it is particularly preferred to make anode 12 of lithium, in conjunction with a liquid cathode of sulfuryl chloride, thionyl chloride, or mixtures thereof.

If desired, arcuate type backing sheets 15 and 17 can be disposed against the inner surface wall of the anode to provide uniform current distribution over the anode. This will result in a substantially uniform consumption or utilization of the anode, while also providing a substantially uniform spring pressure over the inner wall surface of anode 12.

Cylindrical cover 40 has a central, cylindrical vent liner containment section 70, with a central circular orifice 60 at the lower end surrounded by a circumferential support ledge 72. Vent liner containment section 70 also comprises cylindrical lower sealing well 74 and rounded containment section shoulder 76. Ledge 72 is integrally joined to lower sealing well 74 at the bottom of lower sealing well 74, and is inwardly directed throughout its circumference toward the geometric axis of sealing well 74, thereby defining orifice 60. Rounded containment section shoulder 76 is located at the intersection of the top of lower sealing well 74 and upper cover ledge 77, the latter being the horizontal surface spanning the area between shoulder 76 and upper cap section 80. Rounded containment section shoulder 76 provides a smooth transition at that intersection without sharp edges.

The preferred illustrated vent liner 29 has an upper cylindrical portion 29a and a lower cylindrical portion 29b of smaller diameter. Lower portion 29b fits in lower well 74. Upper portion 29a fits in upper cap section 80. The liner has an orifice 25 connecting its two circular ends. The vent liner is positioned in cover 40 so that one of its ends may abut support ledge 72 and its cylindrical surface is in contact with the inner surface of the well. It also abuts against ledge 77. While it is preferred that ledge 72 be continuous about the circumference of sealing well 74 so as to minimize the potential for an undesired electrochemical cell system arising between the inside of the cell and atmospheric constituents, support ledge 72 can also comprise one or more inwardly projecting tabs or segments sufficient to provide a ledge against which vent liner 29 can abut. An alternative vent liner could be cylindrical in shape, just filling the lower well 74.

Vent liner 29 can be formed by molding, or if it does not have an upper flange, it can be made by cutting a suitable length of appropriately sized tubing or by molding a sheet of material to shape during the process of force fitting the vent member into place. The material from which vent liner 29 is made can be resilient or nonresilient, but must be both resistant to attack by the electrolyte and not react with a seal member force-fitted therein so as to substantially alter the pressure at which the force-fitted seal member is ejected from the vent liner 29. It is presently preferred that vent liner 29 be a molded vent liner of Tefzel(R), available from E.I. DuPont de Nemours & Co., Wilmington, Del., although other materials are suitable, such as polyethylene, polytetrafluoroethylene, perfluoroalkoxy polymer, fluorinated ethylene-propylene polymer, glasses, etc.

Vent member 56 is force-fitted into vent liner orifice 25 to seal the cell. This vent member preferably has a smooth spherical configuration, as exemplified by ball 56 in FIG. 1. Vent member 56 can be made of a resilient or nonresilient material such as metal, glass, ceramic, or plastics, and is made of a material or coated with a material that is chemically resistant to the cell components, particularly the liquid components. If vent member 56 is resilient, it can be made from polytetrafluoroethylene, fluorinated ethylene-propylene copolymer, perfluoroalkoxy polymer, ethylene-tetrafluoroethylene copolymer or other selected fluoropolymers. When vent member 56 is to be coated with a chemically inert material, it can then be made of any material.

Steel cover 40 is formed by a series of cold working steps such that it is highly cold-worked when its final configuration is obtained. This structure is depicted also in the above noted U.S. Pat. No. 4,931,368. Alternatively, the cover can then be annealed to achieve good corrosion resistance, as set forth in application Ser. No. 519,583, filed May 7, 1990, pending, and entitled CELL COVER WITH INTERNAL COMPRESSION RING OF HIGH YIELD STRENGTH MATERIAL (Attorney Docket No. EVE01 P-393). That structure, rather than having the outer edge turned up through the 180' formation as shown herein, has the lower edge just turned in radially with the radially outward compression provided by a compression ring.

Between the outer surface of outer, cylindrical, depending wall of cover 40 and the inner wall of container 2 is an annular resilient gasket 52.

An electrically conductive spring strip 28, whose legs 32 and 34 are biased against the anode members, is electrically connected to cell cover 40 so as to make cover 40 the anodic or negative terminal of the cell. The ends of spring legs 32 and 34 can be electrically connected to cover 40 by welding the ends to cover 40. Alternatively, the geometric configuration of cell cover 40 may use the connection system in U.S. Pat. No. 4,931,368, filed Sept. 25, 1987.

To fabricate the cell illustrated in the figure, a stainless steel strip, e.g., of 304L stainless steel, having a smooth surface finish, is subjected to a blanking operation, which cuts out a flat disc of a size sufficient so that cover 40 can be drawn from it. The disc is then drawn into a cup shape and a cover flange is formed.

Vent liner containment section 70 and annular cap section 80 are next formed in the partially formed cover by a drawing operation. To prevent cracking during drawing, it is preferred that this drawing operation be performed in a number of steps, each successively drawing cover 40 closer to its final form. Cover orifice 60 is then formed in a punching (or drilling) operation. Alternatively the containment section 70 may be formed first in the drawing operations.

The foregoing drawing operations will affect somewhat the smooth surface finish of the steel. Generally, the finish will remain sufficiently smooth such that subsequent insertion of vent liner 29 into sealing well 74 can be performed in a way that yields intimate contact between them. However, if desired, additional finishing operations may be carried out to further smooth the sealing surface.

The two sections of vent liner 29 preferably have outside diameters slightly larger than the inside diameters of the vent liner containment sections so that the vent liner can be press-fitted into the vent liner containment section to yield an interference fit.

Vent liner 29 is inserted into sealing well 74 until the bottom of vent liner 29 abuts support ledge 72 or, if the vent liner has an upper flange, the bottom of the upper flange rests on cover ledge 77. In this way, support ledge 72 or cover ledge 77 provides a positive stop against which vent liner 29 cannot be further inserted. In addition, the interference fit causes the outer surface of vent liner 29 to be strongly forced against the inner surface of sealing well 74 and against the inner wall of the upper portion, which causes intimate contact between those two surfaces, thereby effectively preventing ionic transport from the inside to the outside of the cell via the interface between vent liner 29 and the vent liner containment section. Since containment section shoulder 76 is rounded, insertion of liner 29 is made easier, and the potential for scoring the liner during insertion is minimized.

It is also preferred for oxyhalide cells that the entire inner surface of the vent liner containment section which contacts the liner be coated with a sealant prior to insertion of liner 29. Such a sealant more completely insures the sealing of liner 29 to the inner surface of the vent liner containment section in the event of possible imperfections on the surface of liner 29 or the vent liner containment section. The sealant can be a halocarbon grease or wax, which is a saturated low-molecular weight polymer of chlorotrifluoroethylene, or a fluoroelastomer. Alternatively, since Tefzel(R) is heat bondable, vent liner 29, when made of this material, can be sufficiently heated prior to or after insertion into the vent liner containment section and press bonded therein.

The raw cell is ultimately placed within an outer jacket 86, the upper end of which is closed by an outer cover 84 by crimping the outer jacket over the upstanding edge of outer cover 84 at 86'. A nonconductive annular separator 88 separates cover 84 from housing 2. The inner cylindrical wall surface of outer jacket 86 is lined with a nonconductive layer, e.g., of Mylar polymer 87, to separate the outer jacket 86 from the inner cell housing 2. A second outer cover 94 is interengaged with and closes the lower end of jacket 86.

Between the annular apex of cap section 80, i.e., the top of the vent well, and the adjacent inner surface of the outer cover 84, is a heat fusible seal 90. This provides a temperature-activated vent mechanism in series with the pressure-activated vent mechanism previously described. It not only serves as a high temperature safety vent but also prevents moisture ingress to the cell, vapor egress from the cell, e.g., of transpired electrolyte such as $SOCl_2$, and gaseous transpiration in or out of the cell.

The seal is advantageously formed of a low melting point metal solder capable of enduring temperature of at least about 100° C. and 500° C., preferably between 200° C. and 350° C.

After insertion of vent liner 29 into sealing well 74, spring collector assembly 28 is pressed onto the cylindrical outside of sealing well 74, and cover 40 is inserted into its proper location inside annular gasket 52. Gasket 52 is located at the open end of cell container 2. If desired, gasket 52 may be coated with a suitable sealant. At the time cover 40 is inserted into annular gasket 52, container 2 has already been supplied with a cathode collector shell 4, a separator liner 6 and a bottom separator 10, an anode 12, and backing sheets 15 and 17. As cover 40 is positioned with respect to gasket 52, the legs 32, 34 of the spring strip 28 are squeezed together and forced into the axial opening between the two screen-backed anode members 14 and 20. The inserted spring strip 28 resiliently biases the two anode members via backing screens 15 and 17 so as to provide substantially uniform and continuous pressure contact over the inner wall of the anode members.

After inserting cover 40 inside gasket 52, the cell is closed and sealed using conventional closing techniques, so that cell container 2 and cell cover 40 make up a sealed cell housing. The cell is then filled with cathode-electrolyte through the vent opening in sealing well 74. After the container is filled with cathode-electrolyte, vent member 56 is disposed over vent liner orifice 25 in liner 29, and a ram member is used to force vent member 56 into orifice 25 until further insertion is resisted because of the presence of support ledge 72.

A ring of solder 90 is positioned on the apex of cover 40 where it will contact the inner surface of the outer cover 84. After the periphery of the outer cover 84 is secured to the outer jacket 86, heat is applied to the outer surface of outer cover 84 to soften and melt the solder sufficiently to cause it to bond between the inner and outer covers 40 and 84 and, when cooled, seal off the annular junction between them. The particular solder selected is chosen with a release temperature appropriate for the particular type of cell. This temperature-responsive seal is then in series with the pressure-responsive seal.

It is to be understood that the improved construction of this invention could conceivably be used in connection with other cell systems, both aqueous and nonaqueous. It is also conceivable that the details of the preferred exemplary embodiment depicted could be modified to suit particular cells. It is not intended that the invention is to be limited by the exemplary cell described, but only by the scope of the appended claims and the reasonable equivalents thereof.

The embodiments of the invention in which an exclusive property or privilege is claimed are defined as follows:

1. An electrochemical cell comprising an inner housing containing active anode, cathode and electrolyte components, said inner housing having an open end;
    an inner cover over said inner housing open end, said inner cover including an outer periphery, a central vent release area, and an annular upstanding rim between said outer periphery and said central vent release area;
    a resilient seal between said outer periphery and said inner housing;
    an outer cell container around said inner housing, having an open end adjacent said inner cover;
    an outer cover over said container open end, having a periphery secured to said container, and being configured and positioned to have an annular portion thereof against said upstanding rim; and
    an inner seal between said annular portion and said annular rim.

2. The electrochemical cell in claim 1 wherein said inner seal comprises a heat fusible seal.

3. The electrochemical cell in claim 1 wherein said inner seal comprises a heat fusible solder connection.

4. The electrochemical cell in claim 1 wherein said inner seal comprises a heat fusible adhesive bond.

5. The electrochemical cell in claim 1 wherein said outer cover is pressed against said rim.

* * * * *